May 2, 1939.  A. P. WOOD  2,157,046
DYNAMO-ELECTRIC MACHINE
Filed Dec. 11, 1937
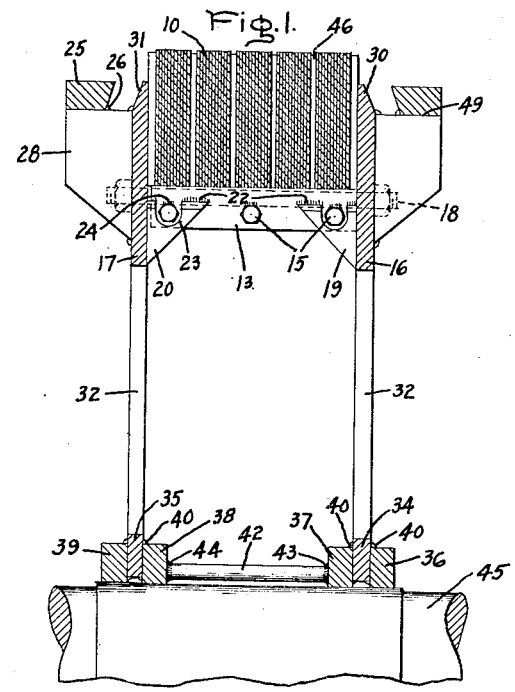
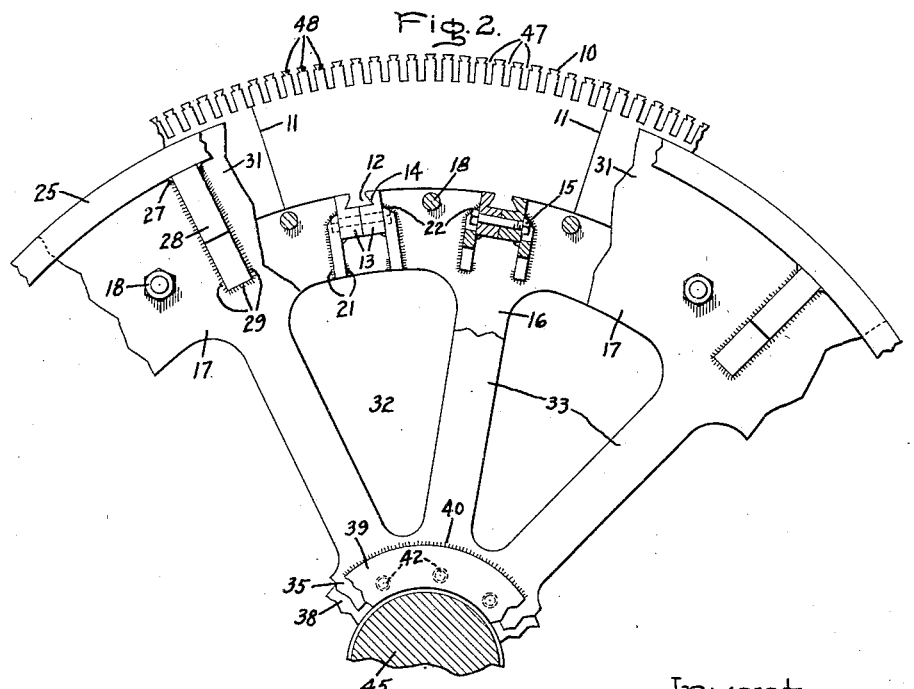
Inventor:
Alexander P. Wood,
by Harry E. Dunham
His Attorney.

Patented May 2, 1939

2,157,046

UNITED STATES PATENT OFFICE 2,157,046

DYNAMO-ELECTRIC MACHINE

Alexander P. Wood, Schenectady, N. Y., assignor to General Electric Company, a corporation of New York Application December 11, 1937, Serial No. 179,319

4 Claims. (Cl. 171—252)

My invention relates generally to the rotatable member of dynamo-electric machines and the method of making the same.

An object of my invention is to provide an improved and simplified construction of the rotatable member of dynamo-electric machines.

Another object of my invention is to provide an improved method of making a rotatable member for dynamo-electric machines.

Further objects and advantages of my invention will become apparent and my invention will be better understood from the following description referring to the accompanying drawing, and the features of novelty which characterize my invention will be pointed out with particularity in the claims annexed to and forming part of this specification.

Referring to the drawing, Fig. 1 is a fragmentary transverse section of the rotatable member of a dynamo-electric machine embodying my invention; and Fig. 2 is a fragmentary end view of my improved rotatable member construction, partially in section.

In making large dynamo-electric machines, it is often undesirable and impractical to utilize complete circular or disk laminations in making the laminated core of the rotatable member, as laminations made in this manner would be too large and unwieldy to handle with ease. As shown in Fig. 2, the laminated core of the rotatable member of a large dynamo-electric machine may be made of segmental arcuate laminations 10 which are assembled with the radial edges 11 thereof in abutting relationship. In this manner, a circular laminated core is readily formed with laminations of easily workable size. In order to secure the laminations 10 in assembled relation, they are formed with inwardly extending dovetail anchor portions 12, and sectional clamping elements formed of two sections 13 having complementary dovetail grooves 14 therein are arranged about the dovetail anchor portions 12 and are secured in clamping relation about these anchor portions by bolts 15. The assembly of laminations 10 forming the laminated core is arranged between end plates 16 and 17 which are securely bolted together by bolts 18 extending through openings in the plates 16 and 17 adjacent the inner periphery of the laminated core. Gussets 19 and 20 are arranged on each side of the clamping elements 13 and are welded to the end plates as shown at 21 and to the clamping elements 13 as shown at 22. These gussets are formed with openings or notches 23 which extend about the heads of two of the bolts 15, and the bolts 15 are welded at 24 to the clamping elements 13. In this manner, the clamping elements and the laminated core are securely fastened together and to the end plates 16 and 17. In order to support the end turns of the winding of the rotatable member, supporting rings 25 are welded at 26 and 27 to outwardly extending gusset plates 28 arranged on the outer side of each of the end plates 16 and 17 and secured thereto by welding, as shown at 29. The end turns supporting rings 25 are spaced from the outer ends 30 and 31 of the end plates 16 and 17, thereby providing an opening through which ventilating air may pass in order to cool the core and the winding of the rotatable member of the machine. The supporting gusset plates 28 act as centrifugal fan blades, and when the rotatable member rotates, the gusset plates 28 serve to blow air through the openings between the supporting rings 25 and the end plates 16 and 17 and over the end turns of the rotatable member winding. In order to reduce the weight of the rotatable member, openings 32 are formed in the end plates 16 and 17 in such a manner as to provide spokes 33 which extend radially inwardly to central circular supporting rings 34 and 35. A supporting hub for the supporting member comprising the end plates 16 and 17, is provided by rings 36, 37, 38, and 39 secured around the inner periphery of the central rings 34 and 35 by welding thereto, as shown at 40. In order to properly space apart the inner ends of the end plates 16 and 17, and to secure together the inner rings 34 and 35 of these end plates, a plurality of tubular spacers 42 of the required length is welded at 43 and 44 to the inner sides of the hub rings 37 and 38, reespectively. The hub rings 36, 37, 38 and 39 are mounted upon a shaft 45, which is supported by any suitable bearings.

In making the rotatable member of a dynamo-electric machine shown in Figs. 1 and 2, the laminations 10 are arranged in assembled relation with spacers 46 between predetermined stacks of laminations to provide radial ventilating ducts between the laminations 10, and these laminations are assembled upon the end plate 16 in a substantially horizontally extending position, so that the end plate 16 supports the laminated core as it is assembled. The laminations are arranged with the slots 47 and teeth 48 in alignment and are brought to a true circle by clamping the sectional clamping elements 13 about the inwardly extending dovetail anchor portions 12 and securely fastening together the two sections of the clamping elements 13 by bolts 15. The ends of the clamping elements 13 adjacent the end plate 16 are then welded thereto and to the gussets 19. The end plate 17 is then arranged on the upper side of the assembled laminations 10 and the bolts 18 are inserted through openings in the end plates 16 and 17 and are then securely bolted in position so as to retain the end plates and the laminated core in assembled relation. The ends of the clamping elements 13 adjacent the end plate 17 are then secured thereto by being welded to the gussets 20, which are welded to the end plate 17. The hub rings 36, 37, 38, and 39 are then welded to the inner rings 34 and 35 and the inner hub rings 37 and 38 are then secured together by welding the tubes 42 at 43 and 44 to the inner surfaces thereof. Gusset plates 28 are then welded to the end plates 16 and 17 at predetermined spaced-apart distances, preferably corresponding to the arcuate distances between the spokes 33, and the end turn supporting rings 25 are then welded to the outer edges 49 of the gusset plates 28. Thus, it is seen that this rotatable member is readily made of fabricated parts and provides a rigid structure which can be readily assembled without requiring any machining operations to provide a structure having definite predetermined dimensions.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States, is:

1. A rotatable member for dynamo-electric machines having a laminated core, inwardly extending anchor portions formed on the inner periphery of said laminated core, clamping elements, means for clamping said clamping elements to said inwardly extending anchor portions of said core, a supporting structure, and means for securing said clamping elements to said supporting structure.

2. A rotatable member for dynamo-electric machines having a laminated core formed of segmental arcuate laminations, inwardly extending dovetail anchor portions formed on the inner periphery of said segmental laminations, sectional clamping elements formed with complementary dovetail grooves arranged about said anchor portions of said laminations, means including end plates for securing together said laminated core, and means for securing said clamping elements to said end plates.

3. A rotatable member for dynamo-electric machines having a laminated core formed of segmental arcuate laminations, inwardly extending dovetail anchor portions formed on the inner periphery of said segmental laminations, sectional clamping elements formed with complementary dovetail grooves arranged about said anchor portions, means for securing together said sectional clamping elements, means for supporting said laminated core, and means for securing said clamping elements to said supporting means.

4. A fabricated rotatable member for dynamo-electric machines having a laminated core, inwardly extending anchor portions formed on the inner periphery of said core, sectional clamping elements, means for clamping said clamping elements about said anchor portions of said core, a supporting structure including end plates extending about the ends of said laminated core, means securing said clamping elements to said end plates and for securing said clamping elements in assembled clamped position about said anchor portions of said core.

ALEXANDER P. WOOD.